US009312912B2

United States Patent
Chen et al.

(10) Patent No.: US 9,312,912 B2
(45) Date of Patent: Apr. 12, 2016

(54) SIGNAL TRANSMITTING AND RECEIVING CIRCUIT OF DIGITAL SUBSCRIBER LINE

(71) Applicant: REALTEK SEMICONDUCTOR CORPORATION, Hsinchu (TW)

(72) Inventors: Yung-Tai Chen, Hsinchu (TW); Cheng-Hsien Li, Tainan (TW); Hung-Chen Chu, Chiayi County (TW); Jian-Ru Lin, Nantou County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 35 days.

(21) Appl. No.: 14/316,539

(22) Filed: Jun. 26, 2014

(65) Prior Publication Data

US 2015/0103986 A1    Apr. 16, 2015

(30) Foreign Application Priority Data

Oct. 16, 2013    (TW) .............................. 102137221 A

(51) Int. Cl.
*H04B 3/00* (2006.01)
*H04B 3/20* (2006.01)
(52) U.S. Cl.
CPC ........................................ *H04B 3/20* (2013.01)
(58) Field of Classification Search
CPC ............ H04L 25/0272; H04L 25/0292; H04L 25/4902; H04L 2203/5483
USPC .................................................. 375/257–258
See application file for complete search history.

(56) References Cited

U.S. PATENT DOCUMENTS

| | | | |
|---|---|---|---|
| 6,163,579 A | 12/2000 | Harrington et al. | |
| 7,453,943 B2 * | 11/2008 | Kuo | H04L 12/66 375/222 |
| 7,756,228 B1 * | 7/2010 | Manickam | H04L 25/03057 375/285 |
| 8,045,702 B2 | 10/2011 | Lin et al. | |
| 2008/0151787 A1 * | 6/2008 | Lin | H04B 3/23 370/276 |

* cited by examiner

*Primary Examiner* — Dac Ha
*Assistant Examiner* — Janice Tieu
(74) *Attorney, Agent, or Firm* — WPAT, P.C., Intellectual Property Attorneys; Anthony King

(57) ABSTRACT

This invention discloses a signal transmitting and receiving circuit of a digital subscriber line used for transmitting an output signal to a telecommunication loop or receiving an input signal from the telecommunication loop. The signal transmitting and receiving circuit comprises a transformer, which is coupled to the telecommunication loop; a signal transmitting module, which is coupled to the transformer, for generating the output signal; a signal receiving module, which is coupled to the transformer, for processing the input signal; an echo cancelling circuit, comprising passive components and having two ends, one of which is coupled to the signal transmitting module and the transformer, the other is coupled to the signal receiving module and the transformer. The output signal is transmitted to the telecommunication loop via the electromagnetic coupling of the transformer, and the input signal is received by the signal receiving module by the electromagnetic coupling of the transformer.

19 Claims, 20 Drawing Sheets

SIGNAL TRANSMITTING AND RECEIVING CIRCUIT OF DIGITAL SUBSCRIBER LINE

BACKGROUND OF THE INVENTION

1. Field of the Invention

The present invention relates to a signal transmitting and receiving circuit of a digital subscriber line, especially to structures of an echo cancelling circuit and a hybrid circuit of the signal transmitting and receiving circuit.

2. Description of Related Art

Please refer to FIG. 1, illustrating a system block diagram of a prior art digital subscriber line (DSL). The digital subscriber line system 10 comprises a client signal transmitting and receiving circuit 105, a telecommunication loop 150, and a central office (CO) 160. The signal transmitting and receiving circuit 105 transmits data signals to the central office 160 or receives data signals from the central office 160 via the telecommunication loop 150. The signal transmitting and receiving circuit 105 comprises a signal transmitting module 110, a signal receiving module 120, an echo cancelling circuit 130, and a hybrid circuit 140. The signal transmitting module 110 generates data signals, which are transmitted to the hybrid circuit 140 by differential signals. The hybrid circuit 140 comprises transformers, which are used to couple the data signals onto the telecommunication loop 150 by electromagnetic coupling to transmit the data signals to the central office 160. When the central office 160 transmits data signals to the signal transmitting and receiving circuit 105, the data signals on the telecommunication loop 150 are also coupled to the signal receiving module 120 for further signal processing by electromagnetic coupling of the hybrid circuit 140.

When the signal transmitting module 110 transmits data signals, a part of the data signals will be coupled to the receiving end of the signal transmitting and receiving circuit 105 because the transmission and reception of the data signals are both processed by the hybrid circuit 140. That is, the data signals received by the signal receiving module 120 comprise the data signals transmitted by the signal transmitting module 110. To prevent the data signals from the signal transmitting module 110 from interfering the signal receiving module 120, which may cause loss of signal to noise ratio (SNR), the echo cancelling circuit 130 is provided to couple between a differential signal transmitting path 115 and a differential signal receiving path 116. The echo cancelling circuit 130 simulates characteristic impedance of the hybrid circuit 140 and the telecommunication loop 150.

Please refer to FIG. 2, illustrating the transmission of data signals inside the signal transmitting and receiving circuit 105. The data signal TX transmitted by the signal transmitting module 110 not only enters the hybrid circuit 140 for coupling to the telecommunication loop 150 but also enters the echo cancelling circuit 130. The data signal TX that enters the hybrid circuit 140 will generate an echo signal TXecho inside the signal transmitting and receiving circuit 105 because of electromagnetic coupling. The data signal RX received by the signal transmitting and receiving circuit 105 via the telecommunication loop 150 is coupled to the signal receiving module 120 via the hybrid circuit 140. As a result, the signal receiving module 120 will receive a mixed data signal RX+TXecho instead of the pure data signal RX because of the interference of the echo signal TXecho.

The echo signal TXecho will be affected by not only the characteristic impedance of the hybrid circuit 140, but also the characteristic impedance of the telecommunication loop 150 because of the electromagnetic coupling of the hybrid circuit 140. To cancel the echo signal TXecho, the echo cancelling circuit 130 must simulate the characteristic impedance of both the hybrid circuit 140 and the telecommunication loop 150. An echo cancelling signal TX' echo will be generated after the data signal TX passes through the echo cancelling circuit 130, and the echo cancelling signal TX'echo will be added to the mixed data signal RX+TXecho by the adder 170 to form a data signal RX' that is equal to RX+TXecho-TX'echo and will be received by the signal receiving module 120. If the echo cancelling circuit 130 is able to perfectly simulate the characteristic impedance of both the hybrid circuit 140 and the telecommunication loop 150, the echo signal TXecho and the echo cancelling signal TX'echo will be ideally equivalent, and thus the signal receiving module 120 can receive only the data signal RX.

The prior art echo cancelling circuit 130 is made of active components, which have advantages of forming any transfer function to easily simulate the polynomials representing the characteristic impedance of the hybrid circuit 140 and the telecommunication loop 150. However, because the active components have bandwidth limitations and zeroes and poles do exist, impedance matching conditions may not be very good within certain frequency ranges or the effects might be very bad at zeroes and poles.

Moreover, the transformers used by the prior art hybrid circuit 140 also have drawbacks. Please refer to FIG. 3, illustrating a part of the signal transmitting and receiving circuit 105 of the digital subscriber line system 10. Since it is now focused on the coupling part of the signal transmitting module 110 and the transformer 310 on the signal transmitting path inside the signal transmitting and receiving circuit 105, the echo cancelling circuit 130 and the signal receiving path are omitted for brevity. The transformer 310 comprises windings 313 and 316, having a turns ratio of N:M. The winding 313 comprises coils 314 and 315, and the winding 316 comprises coils 317 and 318. Because the voltage induced by the coils has polarity, the two ends of each coil 314, 315, 317, and 318 inside the transformer 310 are considered to be a first polarity end and a second polarity end. In this disclosure, a hollow circle is used to represent the first polarity end and the second polarity end has no marks on it. As shown in FIG. 3, a positive end TXP of the differential signal pair of the signal transmitting module 110 is coupled to the first polarity end of the coil 314 through the impedance unit 301, the second polarity end of the coil 314 is coupled to the first polarity end of the coil 315, and the second polarity end of the coil 315 is coupled to the negative end TXN of the differential signal pair of the signal transmitting module 110 through the impedance unit 302. On the other side of the transformer 310, the second polarity end of the coil 317 is coupled to the first polarity end of the coil 318 through the capacitor 319, and the two ends of the telecommunication loop 150 are respectively coupled to the first polarity end of the coil 317 and the second polarity end of the coil 318. Because the signal transmitting module 110, the impedance units 301 and 302 and the winding 313 are connected in series, if the signal transmitting module 110 wants the transmitting signal to have an optimal upstream power to transmit, according to the impedance matching theory, the output voltage of the signal transmitting module 110 must be twice the voltage required by the winding 313. In this way, the two ends of the winding 313 can obtain required voltage, but unfortunately half the voltage swing is lost on the impedance units 301 and 302. In addition, a higher working voltage is a burden to components that are manufactured by advanced semiconductor processes and thus are less endurable to high voltages. However, raising the voltage endurance of the components may increase the circuit cost and making the components work under too much voltage may shorten the life of the components.

SUMMARY OF THE INVENTION

In consideration of the imperfections of the prior art, an object of the present invention is to provide Signal transmitting and receiving circuit of digital subscriber line, so as to make an improvement to the prior art.

The present invention discloses a signal transmitting and receiving circuit of a digital subscriber line for transmitting an output signal to a telecommunication loop or receiving an input signal from the telecommunication loop. The signal transmitting and receiving circuit comprises: a transformer comprising a first winding, a second winding, and a third winding, the first winding comprising a first coil and a second coil, the third winding coupled to the telecommunication loop and the first and the second coils comprising respectively a first polarity end and a second polarity end; a first impedance unit comprising two ends coupled respectively to the first polarity end of the first coil and the first polarity end of the second coil; a second impedance unit comprising two ends coupled respectively to the second polarity end of the first coil and the second polarity end of the second coil; a signal transmitting module, coupled to the first winding, for generating the output signal; and a signal receiving module, coupled to the second winding, for processing the input signal; wherein, the first winding and the third winding transmit the output signal to the telecommunication loop by electromagnetic coupling, and the third winding and the second winding transmits the input signal to the signal receiving module by electromagnetic coupling.

The present invention also discloses a signal transmitting and receiving circuit of a digital subscriber line for transmitting an output signal to a telecommunication loop or receiving an input signal from the telecommunication loop. The signal transmitting and receiving circuit comprises: a transformer coupled to the telecommunication loop; a signal transmitting module, coupled to the transformer, for generating the output signal; a signal receiving module, coupled to the transformer, for processing the input signal; and an echo cancelling circuit made of passive components and comprising two ends, one of which is coupled to the signal transmitting module and the transformer, and the other is coupled to the signal receiving module and the transformer; wherein, the output signal is transmitted to the telecommunication loop by electromagnetic coupling of the transformer, and the input signal is transmitted to the signal receiving module by electromagnetic coupling of the transformer.

The client signal transmitting and receiving circuit of a digital subscriber line of the present invention can simulate the characteristic impedance of both the hybrid circuit and the telecommunication loop by using only passive components. Compared with implementing the transfer function by using active components, the multi-order transfer function of this invention is able to adjust the DC gain and the pole frequency of each order according to practical situations, and therefore is more flexible. In addition, an asymmetric digital subscriber line (hereinafter referred to as ADSL) and a very high speed digital subscriber line (hereinafter referred to VDSL) can share the same echo cancelling circuit. Moreover, the signal transmitting and receiving circuit of the present invention uses a three-winding transformer and connects a signal transmitting module, impedance units and the windings of the transformer in parallel to achieve output impedance matching and uses low voltage swing to transmit signal. The signal receiving path and the signal transmitting path do not share windings so the received signal can maintain a higher amplitude.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention field. If any term is defined in the specification, such term should be explained accordingly. Besides, the connection between objects in the following embodiments can be direct or indirect provided that these embodiments are still applicable under such connection. Said "indirect" means that an intermediate object or a physical space exists between the objects. The present invention discloses a signal transmitting and receiving circuit of a digital subscriber line, and the detail known in this field will be omitted if such detail has little to do with the features of the present invention. People of ordinary skill in the art can choose components or steps equivalent to those described in this specification to carry out the present invention, which means that the scope of this invention is not limited to the embodiments in the specification. On account of that some or all elements of said device invention could be known, the detail of such elements will be omitted provided that this omission nowhere dissatisfies the specification and enablement requirements.

Figure 1:
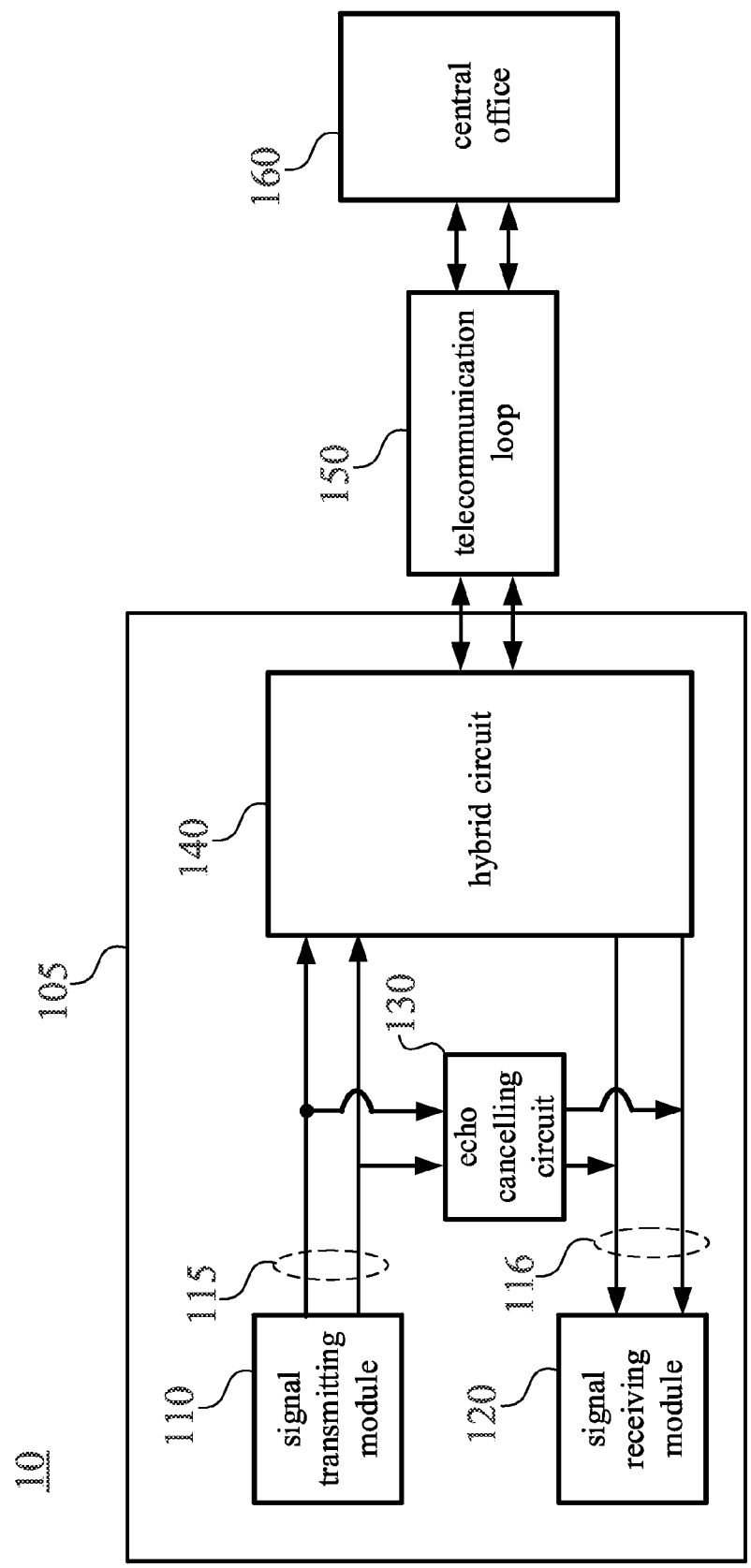
FIG. 1 illustrates a system block diagram of a prior art digital subscriber line.
Figure 2:
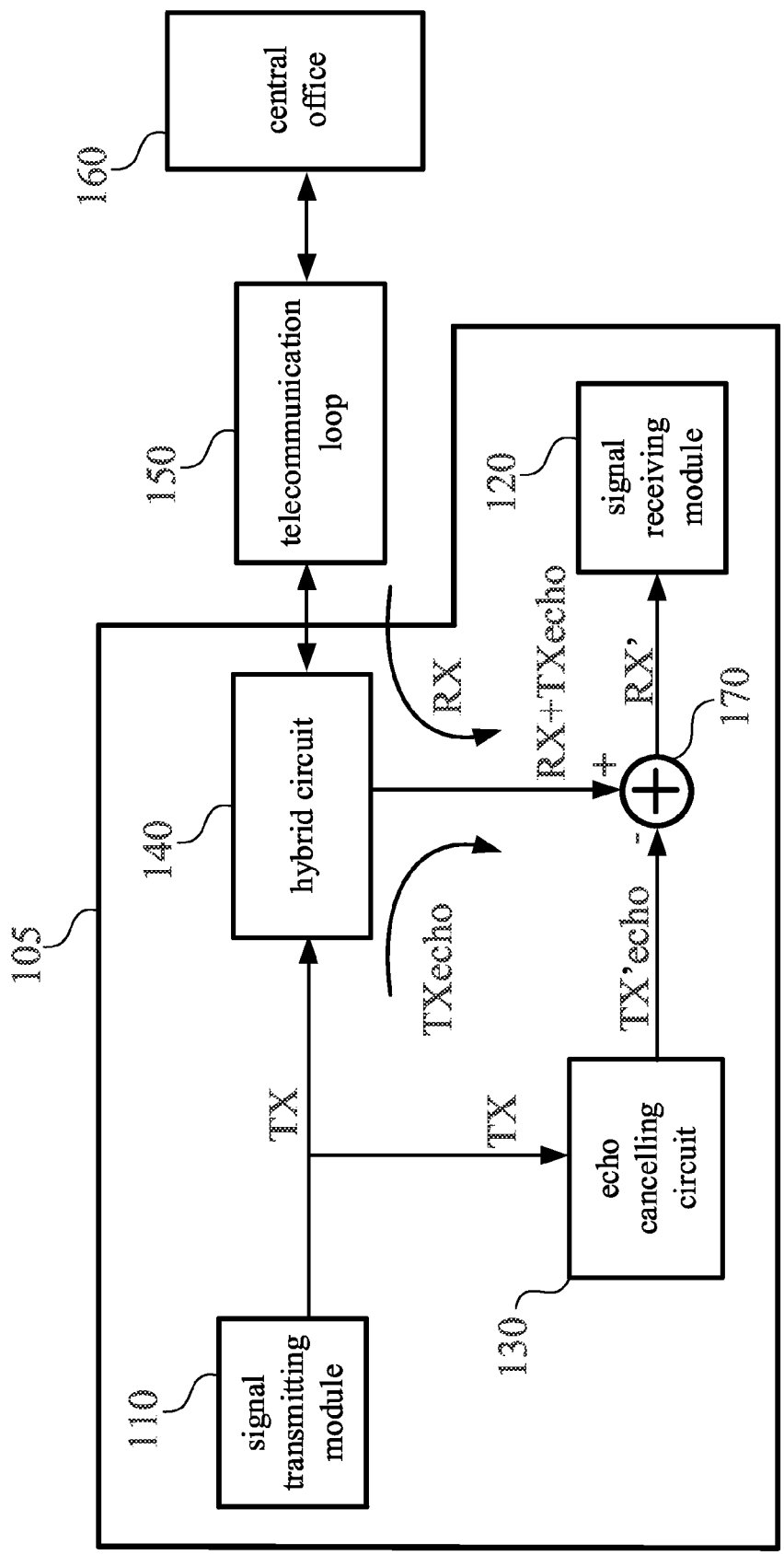
FIG. 2 illustrates the transmission of data signals inside the signal transmitting and receiving circuit 105.
Figure 3:
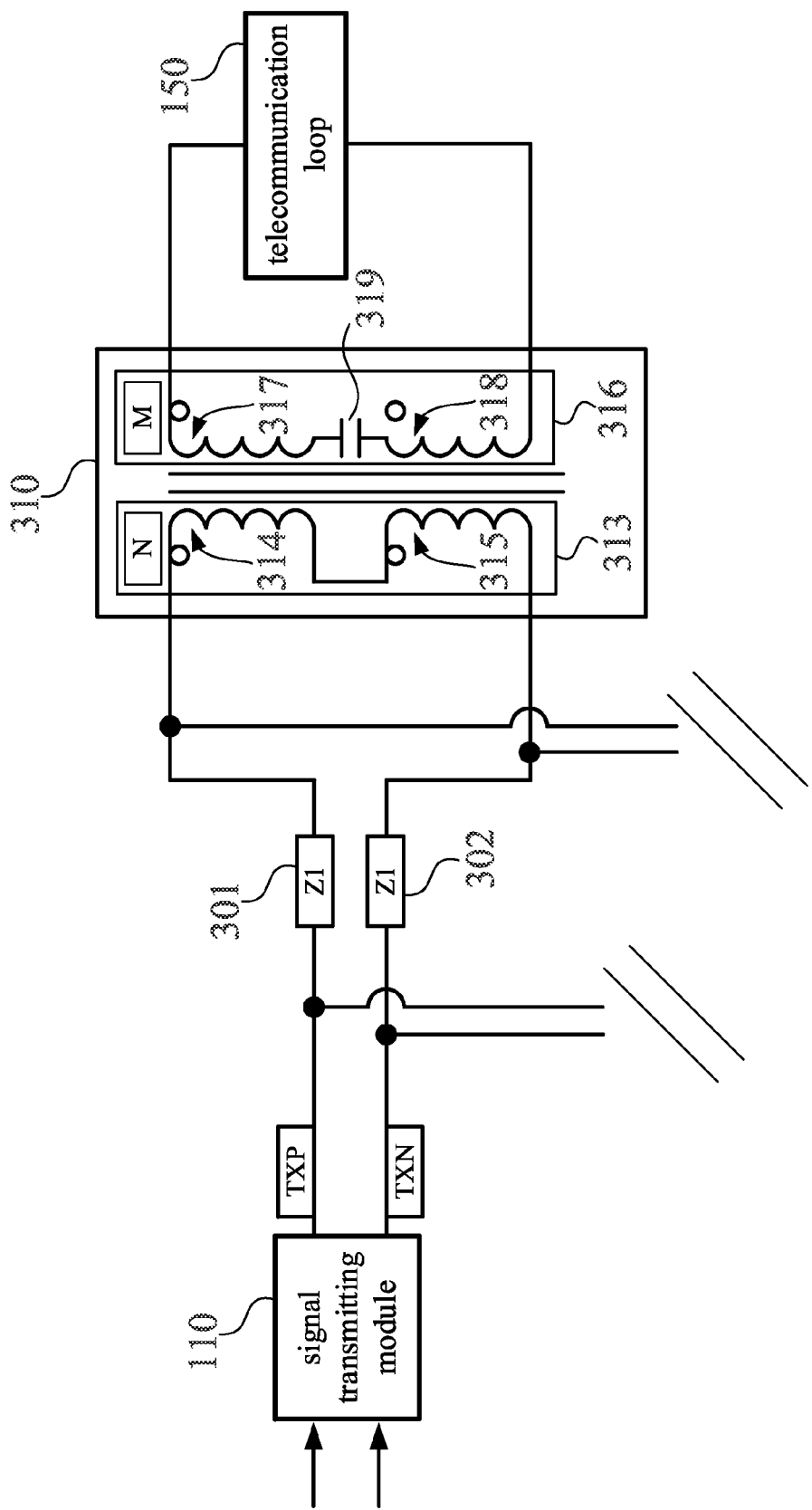
FIG. 3 illustrates a part of the signal transmitting and receiving circuit 105 of the digital subscriber line system 10.
Figure 4:
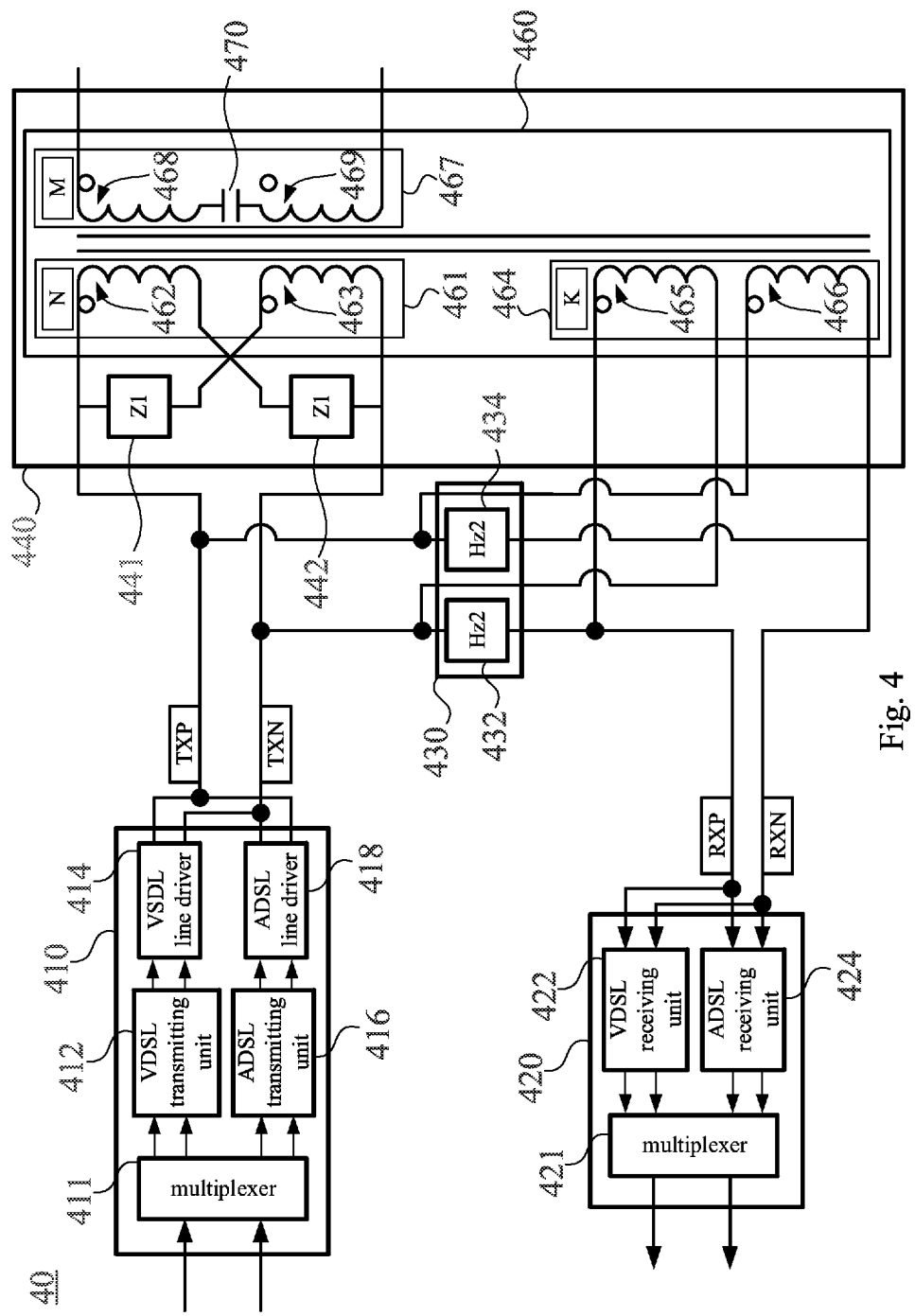
FIG. 4 illustrates a client signal transmitting and receiving circuit of a digital subscriber loop according to a preferred embodiment of the present invention.

Please refer to FIG. 4, illustrating a client signal transmitting and receiving circuit of a digital subscriber loop according to a preferred embodiment of the present invention. The signal transmitting and receiving circuit 40 comprises a signal transmitting module 410, a signal receiving module 420, an echo cancelling circuit 430, and a hybrid circuit 440. The signal transmitting module 410 comprises a multiplexer 411, a VDSL transmitting unit 412, a VSDL line driver 414, an ADSL transmitting unit 416, and an ADSL line driver 418. By the selection of the multiplexer 411, the signal transmitting module 410 decides to transmit the data signal via the VDSL transmitting unit 412 or the ADSL transmitting unit 416 and therefore the data signals can be transmitted in corresponding frequency bands. The frequency band of VDSL is 30 k~27 MHz and that of ADSL is 30 k~2.2 MHz. The VSDL line driver 414 and the ADSL line driver 418 are used to raise the transmission power of the data signals. The signal receiving module 420 comprises a multiplexer 421, a VDSL receiving unit 422, and an ADSL receiving unit 424. The VDSL receiving unit 422 and the ADSL receiving unit 424 receives data signals belonging to their individual frequency bands. By the selection of the multiplexer 421, the signal receiving module 420 can process proper data signals according to practical situations. In short, by properly controlling the multiplexer 411 and the multiplexer 421, the signal transmitting and receiving circuit 40 of the present invention can be applied to VDSL and ADSL. In a single hardware system, the transmitting end can work at the frequency band of ADSL while the receiving end works at the frequency band of VDSL and vice versa according to different spectrum or communication protocols.

The hybrid circuit 440 comprises an impedance unit 441, an impedance unit 442, and a transformer 460. The transformer 460 comprises a winding 461, a winding 464 and a winding 467. The winding 461 and the winding 464 locate on the primary side of the transformer 460, and the winding 467 locates on the secondary side of the transformer 460. The winding 467, which is coupled to telecommunication loop (not shown), comprises a coil 468, a coil 469 and a capacitor 470. The coil 468 has its first polarity end coupled to the telecommunication loop and its second polarity end coupled to the first polarity end of the coil 469 via the capacitor 470, and the second polarity end of the coil 469 is coupled to the telecommunication loop. The winding 461 comprises a coil 432 and a coil 463. The first polarity end of the coil 462 is coupled to one end of the impedance unit 441 and the positive end TXP of the differential signal pair of the signal transmitting module 410, and the second polarity end of the coil 462 is coupled to one end of the impedance unit 442. The coil 463 has its first polarity end coupled to the other end of the impedance unit 441 and its second polarity end coupled to the other end of the impedance unit 442 and the negative end TXN of the differential signal pair of the signal transmitting module 410. Under such connection, the signal transmitting module 410 is substantially connected in parallel with the impedance unit 441, the impedance unit 442, and the winding 461 and therefore the output voltage on the differential signal pair of the signal transmitting module 410 can be totally provided to both ends of the winding 461 without any voltage drop in the transmission path. Consequently, under the premise that the transformer 460 is able to work stably to couple the data signals to the telecommunication loop, the differential signal pair of the signal transmitting module 410 only needs to provide the lowest voltage, which will not cause damage to the components on the circuit. Compared with the prior art, the signal transmitting module 410, the impedance unit 441, the impedance unit 442 and the winding 461 are connected substantially in parallel so that the differential signal pair of the signal transmitting module 410 only needs to output smaller voltage to achieve the same results. This kind of design matches the trend that the operating voltage decreases as the manufacturing process and size of the components become miniaturized.

The winding 464 comprises a coil 465 and a coil 466. The coil 465 has its first polarity end coupled to the positive end RXP of the differential signal pair of the signal receiving module 420 and its second polarity end coupled to the negative end TXN of the differential signal pair of the signal transmitting module 410. The coil 466 has its first polarity end coupled to the positive end TXP of the differential signal pair of the signal transmitting module 410 and its second polarity end coupled to the negative end RXN of the differential signal pair of the signal receiving module 420. The winding 461 and the winding 467, which have a turns ratio of N:M, couple the to-be-transmitted data signals from the signal transmitting module 410 to the telecommunication loop by electromagnetic coupling; on the other hand, the winding 467 and the winding 464, which have a turns ratio of M:K, couple the input data signals from the telecommunication loop to the signal receiving module 420 by electromagnetic coupling. N, M and K are positive numbers. A conventional signal transmitting and receiving circuit often uses a transformer that has only two windings to perform electromagnetic coupling for transmitting and receiving signals. Therefore if a turns ratio of the winding on the primary side to the winding on the secondary side is set to be 1:L to raise the voltage for signal transmission, this setting will inevitably cause the voltage of an input signal to become 1/L times of its original amplitude when the input signal is received by the same signal transmitting and receiving circuit. However, the present invention uses the three-winding transformer 460 and the respective turns ratios can be adjusted flexibly to ensure that the signal voltage is raised during signal transmission and meanwhile the receiving end can receive data signals with higher voltage amplitude without being affected by the turns ratio at the transmitting side. As a result, the received data signals have higher SNR and are therefore more resistant to background noises that may probably exist. In a preferred embodiment, the turns ratios can be set with M/N>1 and K/M>1.

The echo cancelling circuit 430 comprises an impedance unit 432 and an impedance unit 434. The impedance unit 432 and the impedance unit 434 are both made of passive components, which comprise resistors, capacitors, inductors, and switching components. The echo cancelling circuit 430 simulates the characteristic impedance of the hybrid circuit 440 and the telecommunication loop. Generally, the telecommunication loop can be divided into two main types, which are straight loop and bridged tap. The characteristic impedance of a straight loop theoretically has only pure resistance components, but practically the loop is not made of resistors only.

Figure 5:
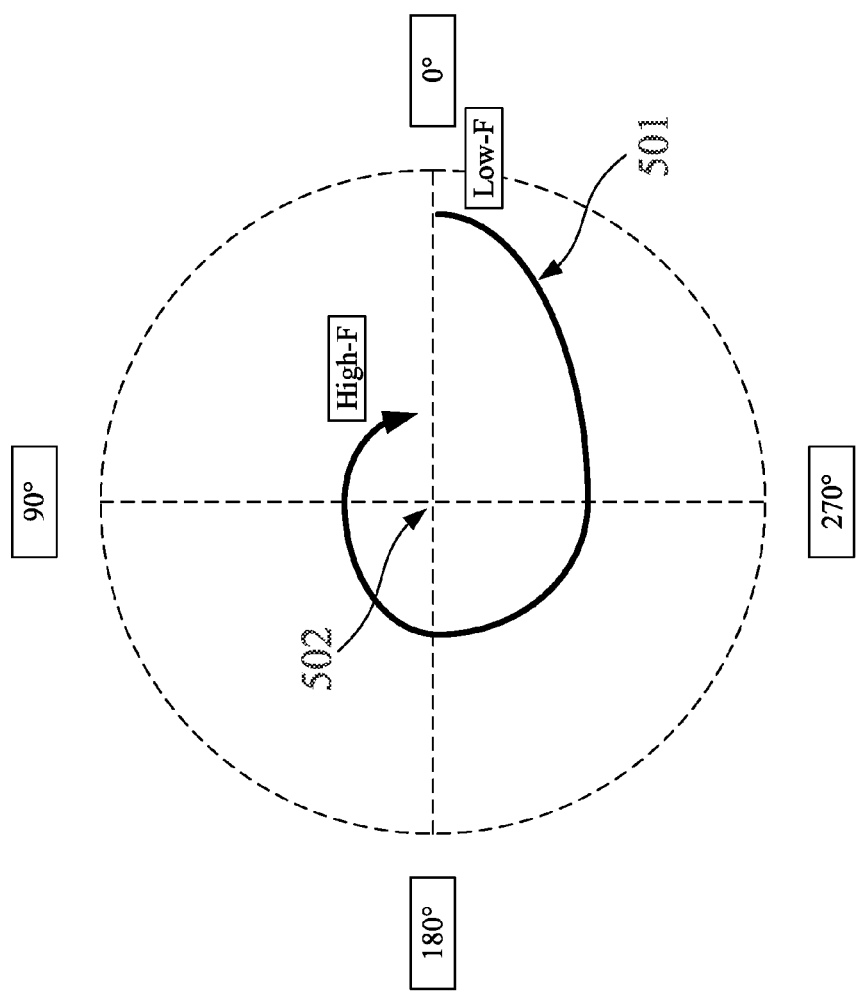
FIG. 5 illustrates a polar plot showing the characteristic impedance of an ADSL straight loop varying with frequency.
Figure 6:
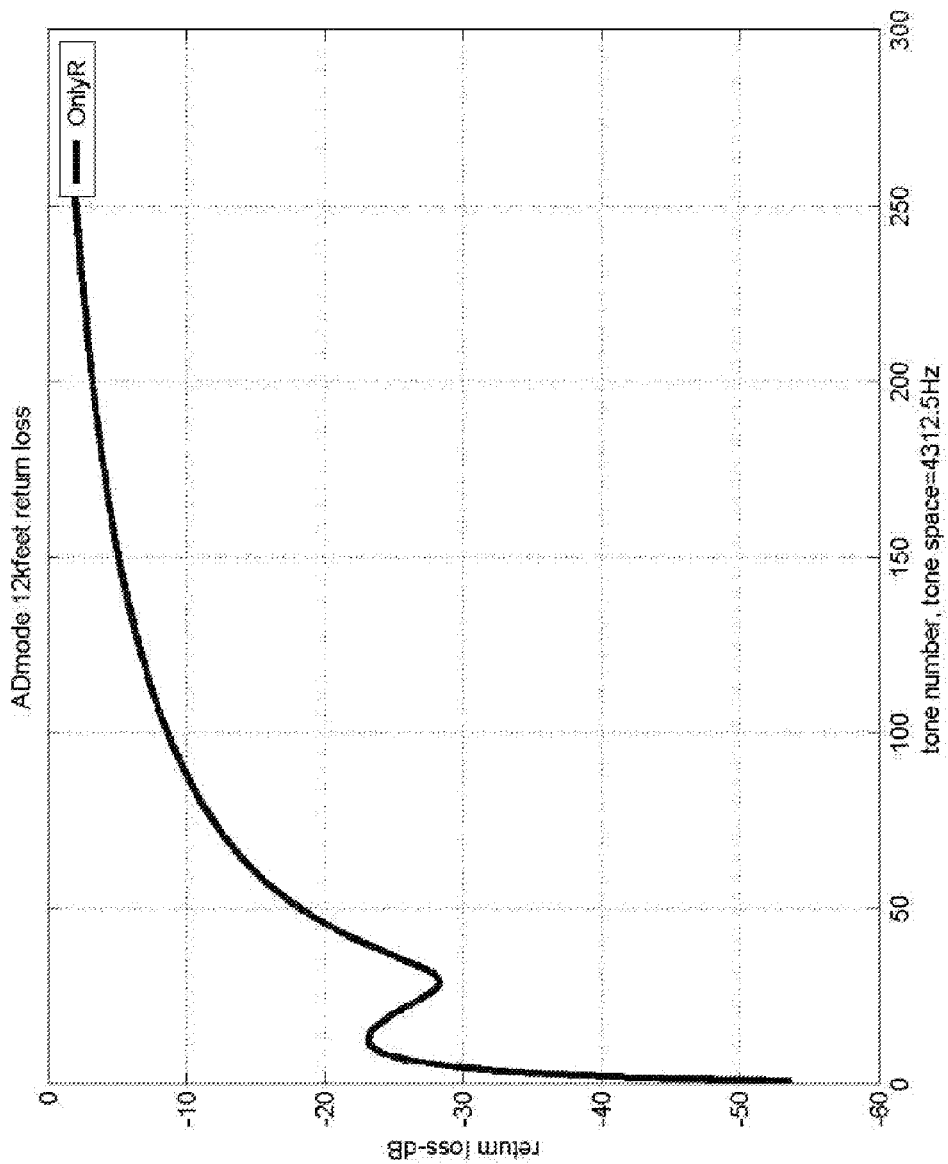
FIG. 6 illustrates a return loss of an ADSL straight loop.
Figure 7:
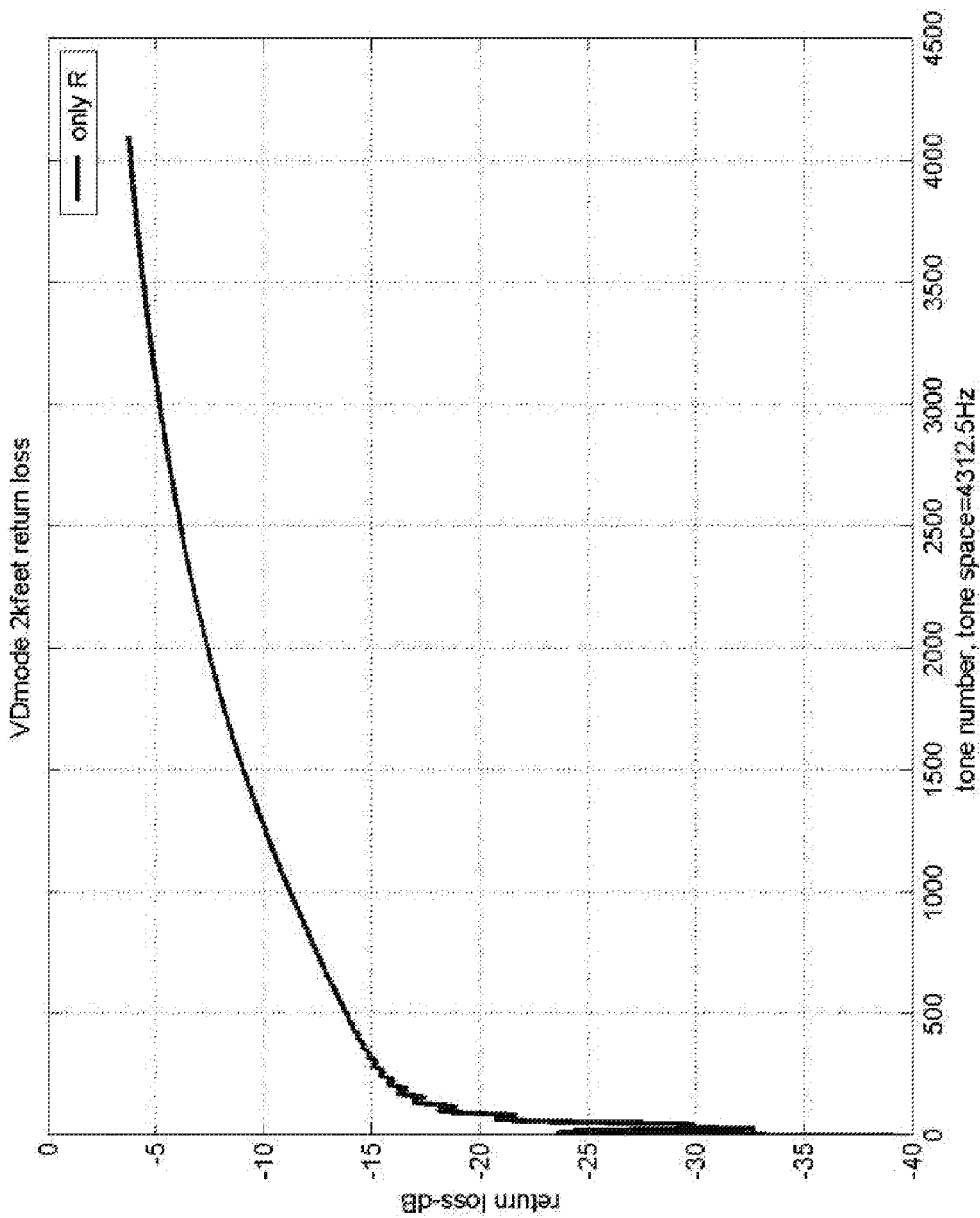
FIG. 7 illustrates a return loss of a VDSL straight loop.

Actually, the straight loop is made of an equivalent circuit that comprises resistance, inductance, capacitance, and conductance, so the real part and the imaginary part of the characteristic impedance will inevitably change in accordance with the frequency band in use. Please refer to FIG. 5, which is a polar plot showing the characteristic impedance of an ADSL straight loop varying with frequency. The curve 501 shows the path of the characteristic impedance varying with frequency. The amplitude (i.e. the distance to the origin 502) of the characteristic impedance of the straight loop varies from low frequency (denoted by Low-F) to high frequency (denoted by High-F) and so does the phase. Please refer to FIG. 6, illustrating a return loss of an ADSL straight loop. A return loss of more than −10 dB happens when the frequency is less than 400 kHz. Please refer to FIG. 7, illustrating a return loss of a VDSL straight loop. A return loss of more than −10 dB happens when the frequency is less than 5.3 MHz. Compared with the straight loop, the characteristic impedance of the bridged tap varies more severely with the frequency. Please refer to FIG. 8, which is a polar plot showing the characteristic impedance of an ADSL bridged tap varying with frequency. The amplitude and the phase of the curve 801 varies severely with the frequency. Practically, the bridged tap is more common than the straight loop so if the echo cancelling circuit 430 can simulate a characteristic impedance identical or close to that of the bridged tap, the feedback part of the data signals in the signal transmitting and receiving circuit 40 can then be decreased or cancelled.

Figure 8:
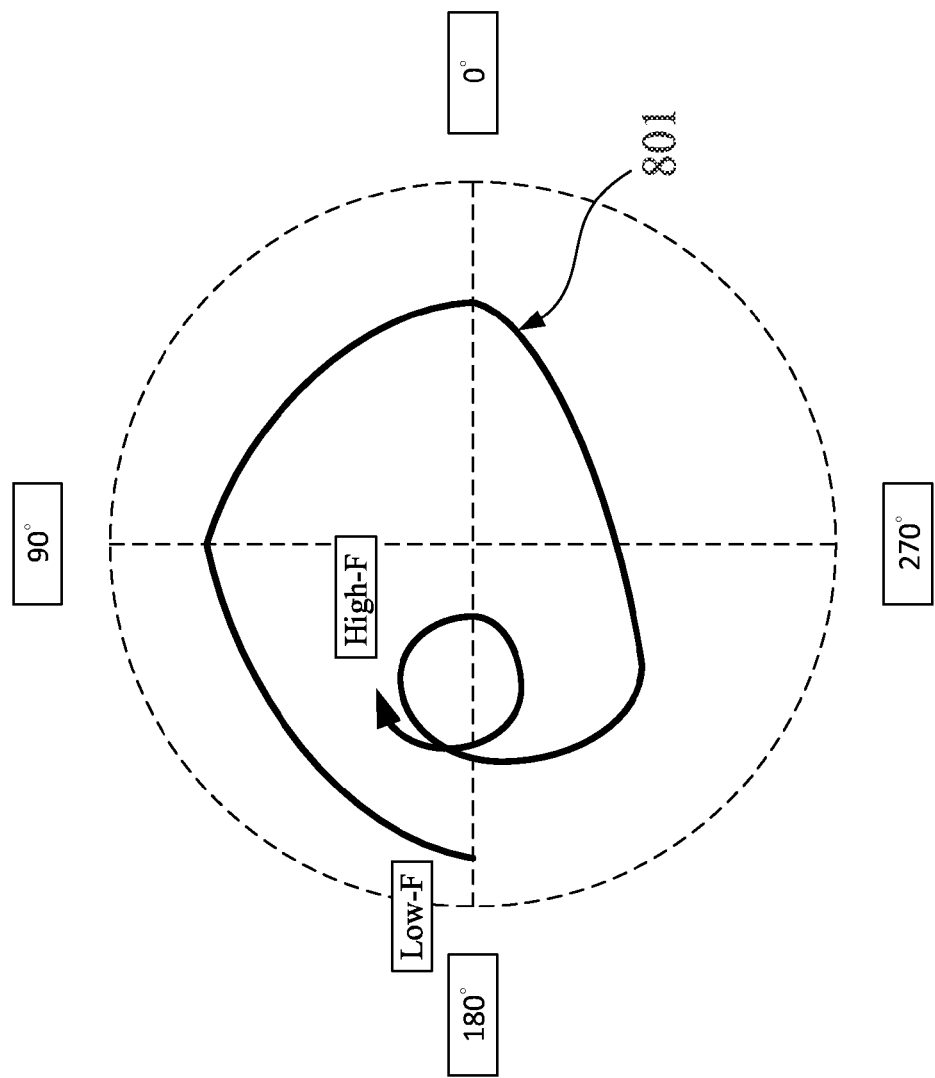
FIG. 8 illustrates a polar plot showing the characteristic impedance of an ADSL bridged tap varying with frequency.

The transfer function of characteristic impedance of a telecommunication loop can be expressed as $H_1(s) = A_0 + A_1 S + A_2 S^2 + A_3 S^3 + \ldots$, where A0, A1, A2 and A3 are coefficients of zero order, first order, second order, and third order, respectively. In the design of the echo cancelling circuit 430, resistors, capacitors and inductors can be properly connected in series and/or in parallel to simulate a transfer function of various orders of the telecommunication loop. The characteristic impedance corresponding to a zero-order transfer function is made of only resistors, representing a distance on the real part to the origin of a polar plot. As shown in FIG. 8, the zero-order transfer function is not able to effectively simulate the characteristic impedance of a telecommunication loop, and therefore higher order transfer functions must be taken into consideration as well. The characteristic impedance corresponding to a first-order transfer function is made of resistors and capacitors, representing a half circle on the polar plot. The first order transfer function can be expressed as:

$$H(s) = K0 + K1 \frac{s}{s + \omega_{p1}} \quad (1)$$

Figure 9:
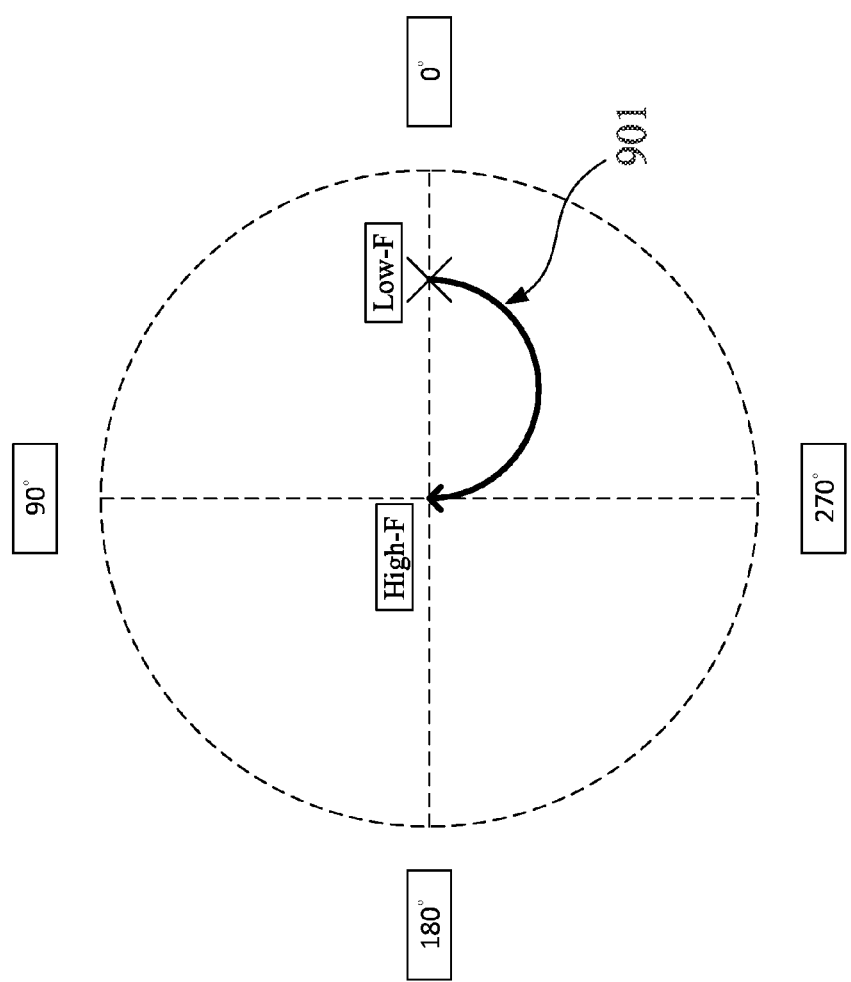
FIG. 9 illustrates a polar plot of the first-order transfer function.

K0 and K1 are DC gains of zero order and first order respectively, and $$\omega_{p1} = \frac{1}{RC}$$

is the angular frequency of the pole. On the polar plot, K0 represents the distance between the center of the half circle and the origin, and K1 represents the radius of the half circle. Please refer to FIG. 9, illustrating a polar plot of the first-order transfer function. The curve 901 depicts a half circle from low frequency to high frequency. Compared with the zero-order transfer function, the first-order transfer function is more likely to effectively simulate the transfer function of the characteristic impedance of a telecommunication loop shown in FIG. 5 or FIG. 8.

Figure 10:
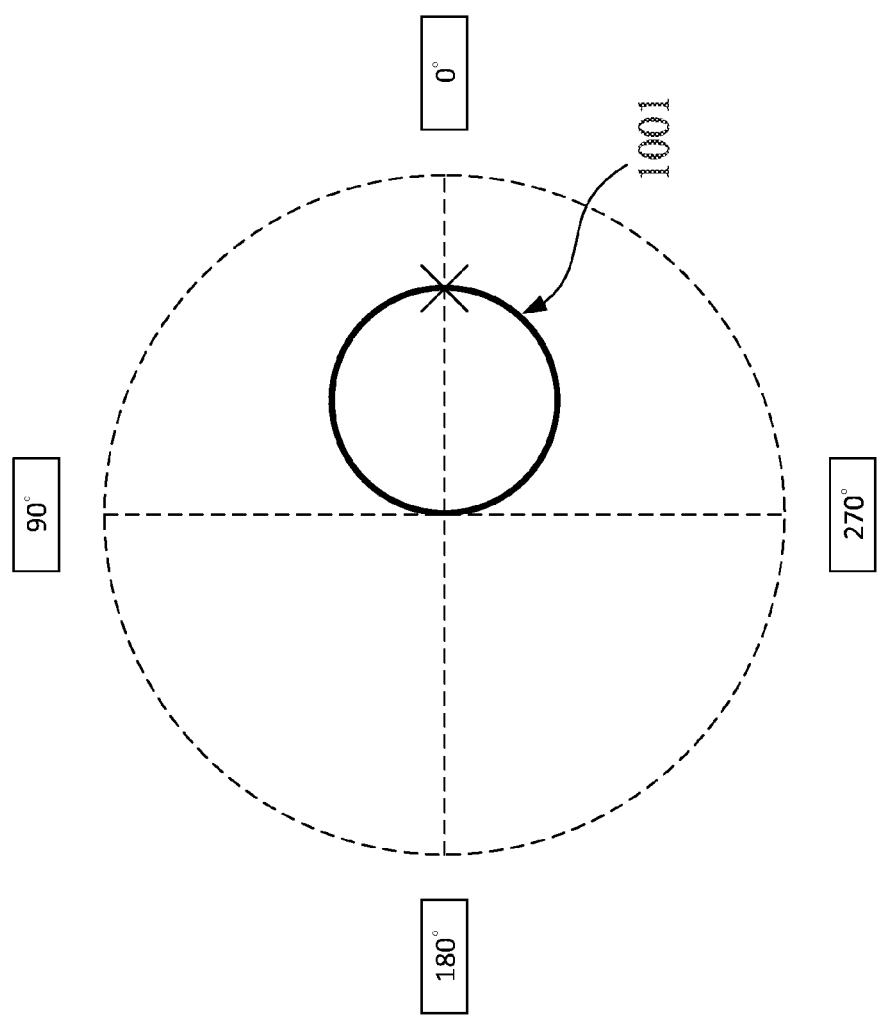
FIG. 10 illustrates a polar plot of a second order transfer function.

Please refer to FIG. 10, illustrating a polar plot of a second order transfer function. The curve 1001 is identical or close to a circle. A transfer function having only the second order is expressed as:

$$H(s) = K2 \frac{\frac{\omega_{p2}}{Q} s}{s^2 + \frac{\omega_{p2}}{Q} + \omega_{p2}^2} \quad (2)$$

K2 is the DC gain of the second order and represents the diameter of the circle on the polar plot.

$$\omega_{p2} = \frac{1}{\sqrt{LC}}$$

is the angular frequency of the pole, and $$Q = \frac{1}{R}\sqrt{\frac{L}{C}}.$$

An angle of any point on the curve 1001 to the origin can be expressed as $$\phi(\omega) = 90° - \tan^{-1} \frac{u}{Q(1-u^2)}, \text{ where } u = \frac{\omega}{\omega_{p2}}.$$

That is, the shape of the curve 1001 can be modified by changing the value of Q, for example, changing the value of Q to make the curve 1001 close to an ellipse.

Combining the above-mentioned transfer function (1), which comprises the zero order and the first order, and the transfer function (2), which comprises only the second order, a second-order transfer function is obtained:

$$H(s) = K0 + K1 \frac{s}{s + \omega_{p1}} + K2 \frac{\frac{\omega_{p2}}{Q} s}{s^2 + \frac{\omega_{p2}}{Q} + \omega_{p2}^2} \quad (3)$$

Figure 11:
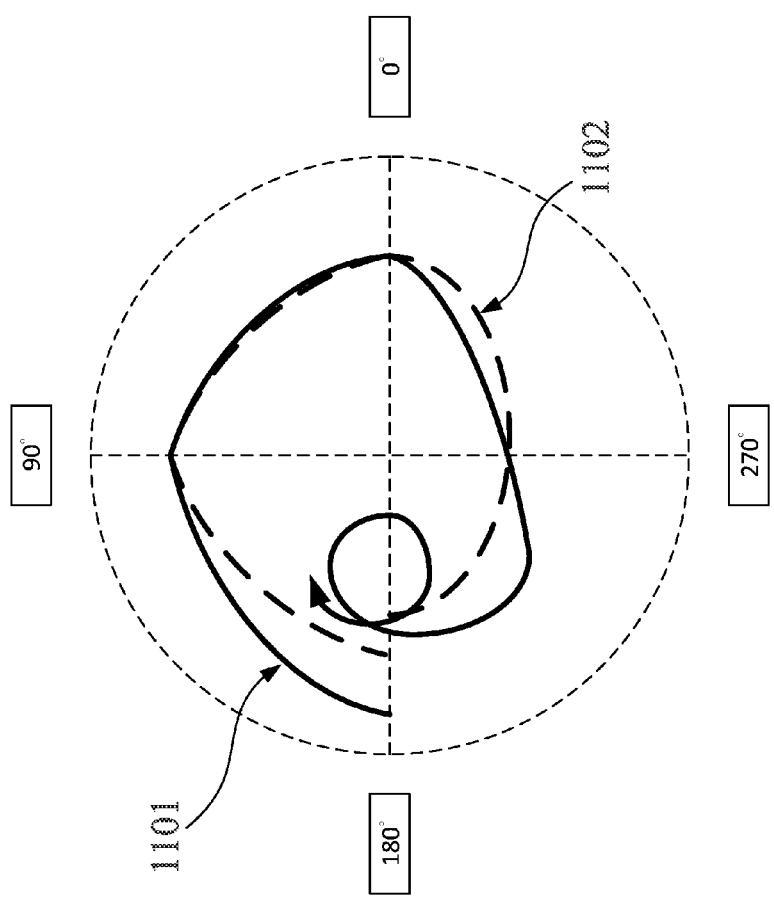
FIG. 11 illustrates a polar plot showing the characteristic impedance of a telecommunication loop simulated by a derived transfer function according to an embodiment of the present invention.

As shown in equation (3) and FIGS. 8 and 10, a characteristic impedance close to that of the telecommunication loop can be simulated by adjusting the values of resistors, capacitors and inductors. Please refer to FIG. 11, which is a polar plot showing the characteristic impedance of a telecommunication loop simulated by a derived transfer function according to an embodiment of the present invention. The curve 1101 represents the transfer function of the characteristic impedance of a bridged tap, and the curve 1102 (dotted line) represents the derived transfer function. As shown in the figure, if the echo cancelling circuit 430 is able to generate, from the derived transfer function, the characteristic impedance corresponding to the curve 1101 at a certain frequency, it can successfully simulate the characteristic impedance of a telecommunication loop to cancel the echo signal.

Figure 12:
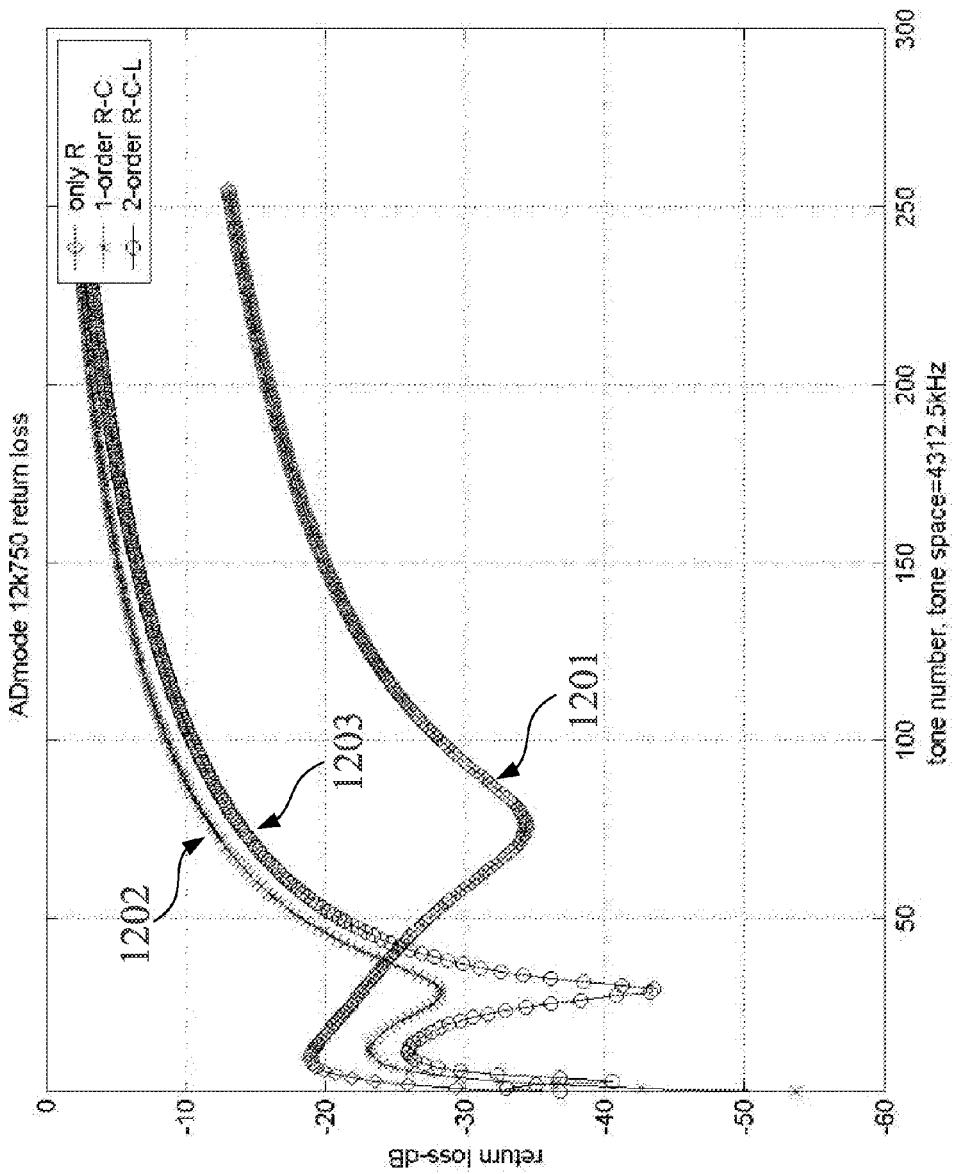
FIG. 12 illustrates a return loss of the signal transmitting and receiving circuit 105 where the echo cancelling circuit 430 uses transfer functions with different orders in ADSL according to an embodiment of the present invention.

Please refer to FIG. 12, illustrating a return loss of the signal transmitting and receiving circuit 105 where the echo cancelling circuit 430 uses transfer functions with different orders in ADSL according to an embodiment of the present invention. The curve 1201 represents a zero-order transfer function of the echo cancelling circuit 430, the curve 1202 represents a first-order transfer function of the echo cancelling circuit 430, and the curve 1203 represents a second-order transfer function of the echo cancelling circuit 430. In the operating frequency range of ADSL (30 kHz~2.2 MHz), the echo cancelling circuit 430 has a better echo cancelling result by using the first-order transfer function than using the zero-order transfer function to simulate the characteristic impedance of the telecommunication loop. That is, the area surrounded by the curve 1202 and the 0-dB axis is larger than the area surrounded by the curve 1201 and the 0-dB axis. Similarly, the echo cancelling circuit 430 has a better echo cancelling result by using the second-order transfer function than using the first-order transfer function to simulate the characteristic impedance of the telecommunication loop. That is, the area surrounded by the curve 1203 and the 0-dB axis is larger than the area surrounded by the curve 1202 and the 0-dB axis.

Figure 13:
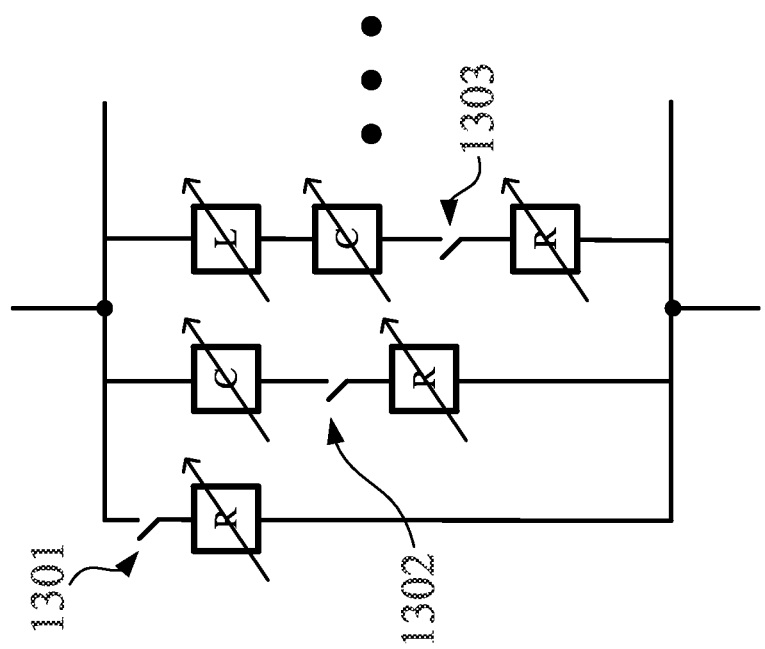
FIG. 13 illustrates the impedance components comprised in the echo cancelling circuit 430 according to an embodiment of the present invention.

In short, the impedance unit 432 and the impedance unit 434 in FIG. 4 can connect the passive components in series and/or in parallel to meet impedance matching based on the aforementioned derivation and simulation results. Please refer to FIG. 13, illustrating the impedance components comprised in the echo cancelling circuit 430 according to an embodiment of the present invention. The impedance unit 432 and the impedance unit 434 can be implemented by the circuit shown in FIG. 13. The circuit comprises a switching component 1301, a switching component 1302, a switching component 1303, and a plurality of variable resistors R, variable capacitors C, and variable inductors L connected in series and/or in parallel. The path where the switching component 1301 locates comprises only a variable resistor R, which means that the path corresponds to the zero order of the transfer function; the path where the switching component 1302 locates comprises only a variable resistor R and a variable capacitor C, which means that the path corresponds to the first order of the transfer function; and the path where the switching component 1303 locates comprises a variable resistor R, a variable capacitor C and a variable inductor L, which means that the path corresponds to the second order of the transfer function. The impedance unit 432 and the impedance unit 434 are not limited to a second-order transfer function; instead, they can connect more resistors R, capacitors C and inductors L in series and/or in parallel to implement higher order transfer functions. The echo cancelling circuit 430 switches among the zero-order, the first-order, and the second-order transfer functions to simulate the characteristic impedance of the hybrid circuit 440 and the telecommunication loop by changing the statuses of the switching components 1301, 1302, and 1303. In a preferred embodiment, when the values of the capacitor C and the inductor L are relatively large, for example for the ADSL applications, the capacitor C and the inductor L can be implemented on the circuit board instead of in this chip to avoid high cost and low effectiveness, but the switching components 1301, 1302, and 1303 are still implemented in the chip. Compared with implementing the transfer function by active components such as an all-pass filter, the multi-order transfer function of the present invention can adjust the DC gain and the pole frequency of each order and modify the component configuration, e.g., the connection manners (in series or in parallel) of the resistor R, the capacitor C and the inductor L, in response to practical situations, which makes the present invention more flexible. Here are some examples to decide the values of passive components. For the first-order circuit, the order of the resistor R is decided according to the input resistance of the signal receiving module 420, for example, an order of kΩ, and then the value of capacitor C is decided according to the position of the pole $$\omega_{p1} = \frac{1}{RC},$$

for example, to cancel most echo signals at the frequency of 150 kHz. For the second-order circuit, similar methods can be used to find the values of matched capacitor C and inductor L according to the position of the pole $$\omega_{p2} = \frac{1}{\sqrt{LC}}.$$

Figure 14A:
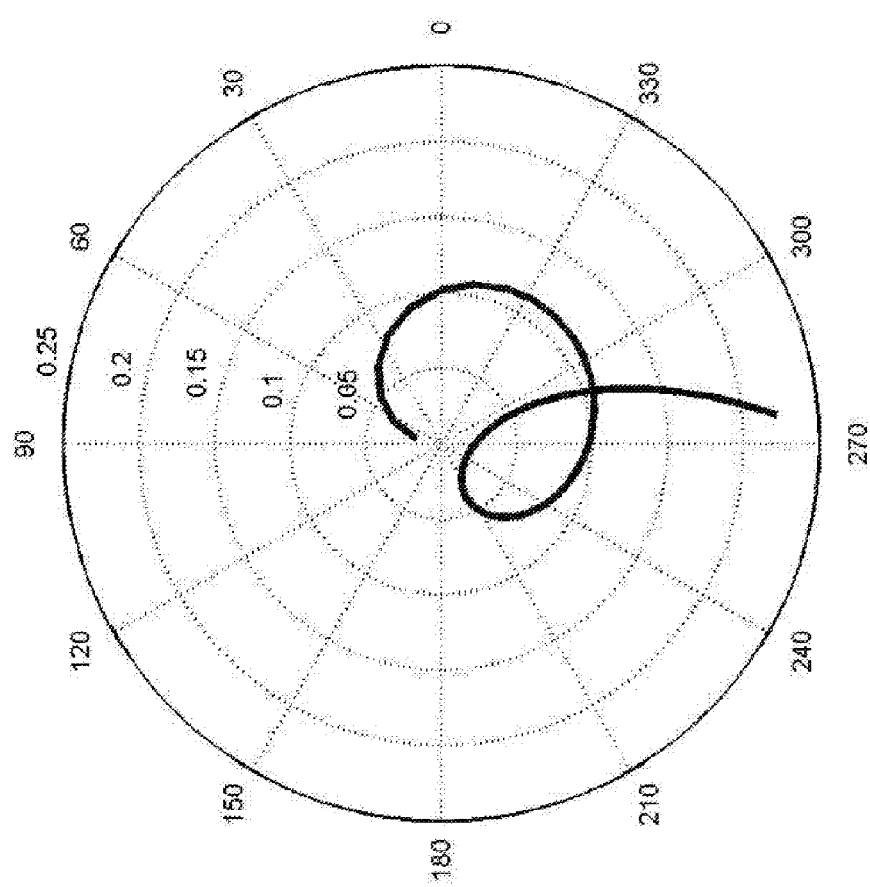
FIGS. 14A and 14B illustrate polar plots by using a zero-order transfer function to respectively simulate the characteristic impedances of ADSL and VDSL telecommunication loops.
Figure 14B:
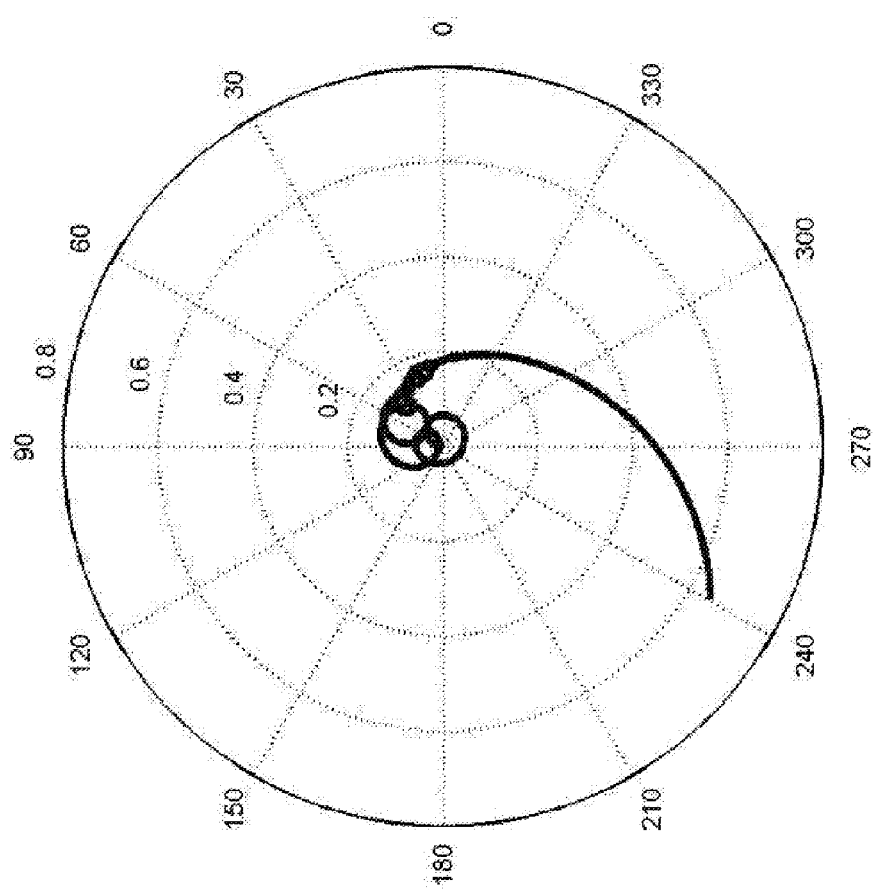
Figure 15A:
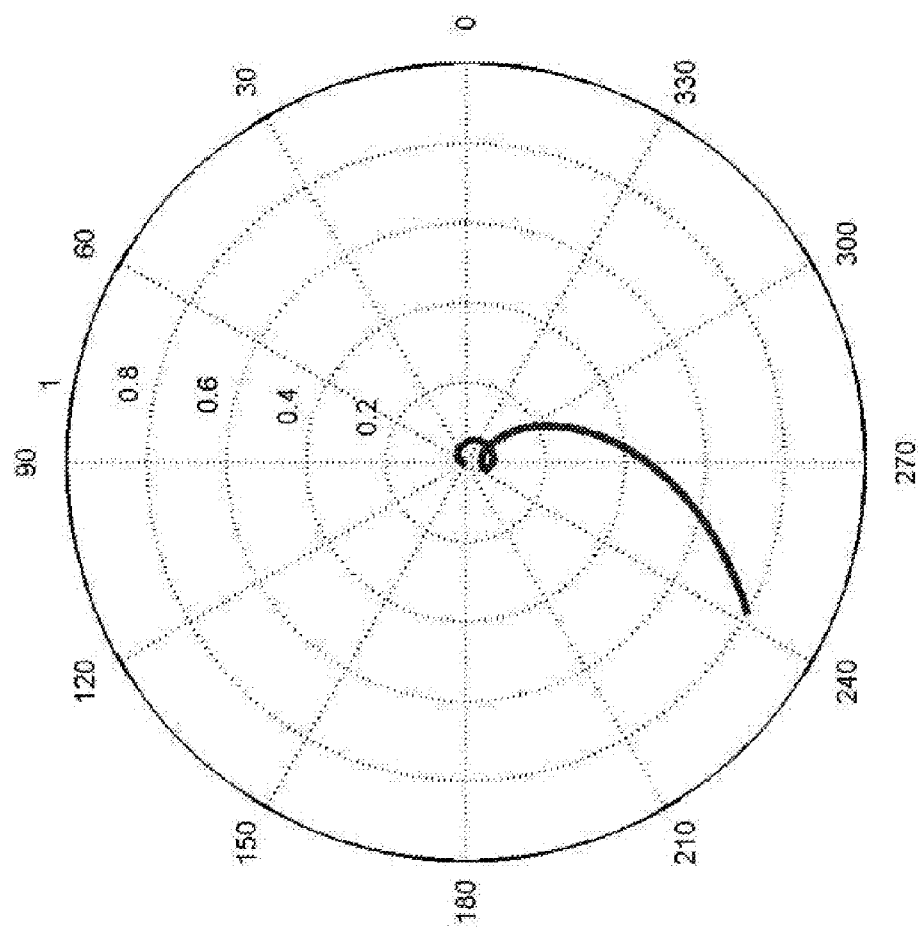
FIGS. 15A and 15B illustrate polar plots by using a first-order transfer function to respectively simulate the characteristic impedances of ADSL and VDSL telecommunication loops.
Figure 15B:
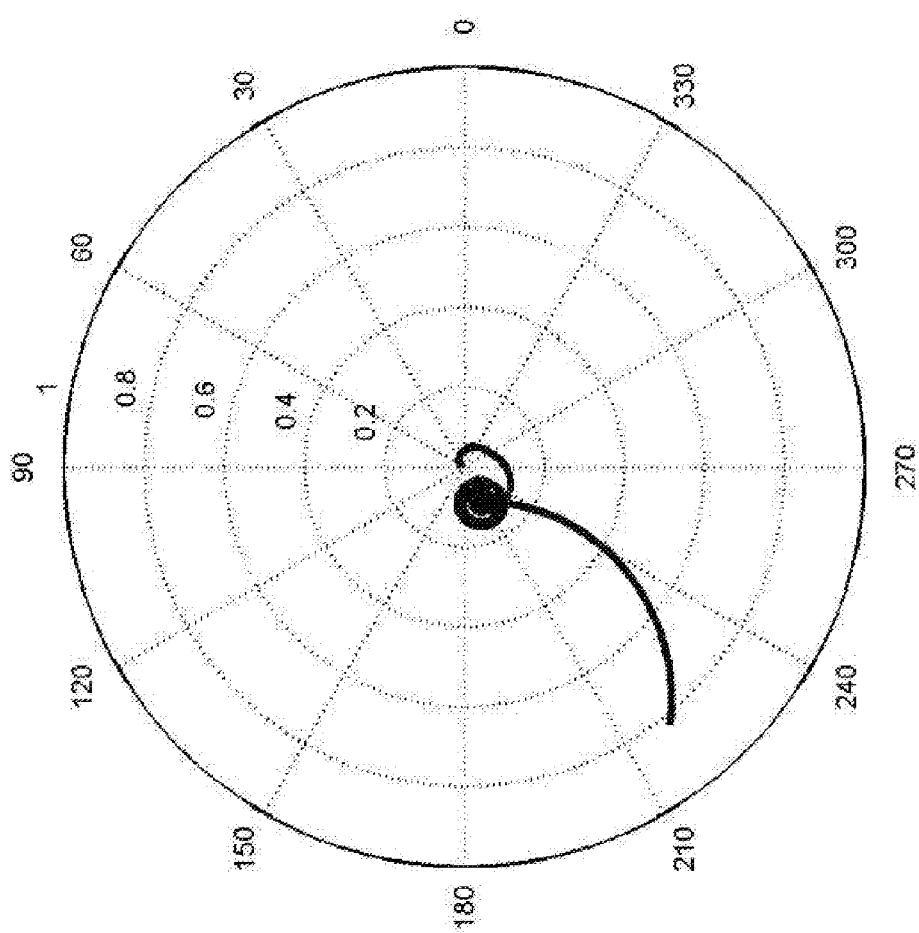
Figure 16A:
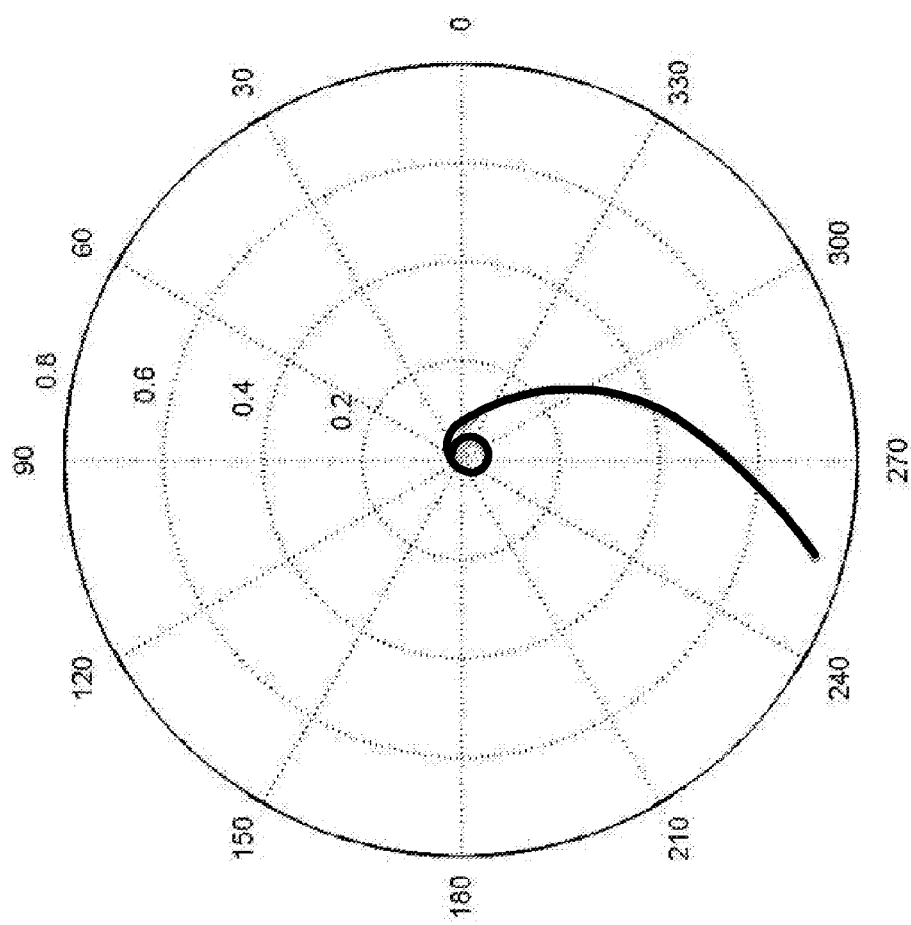
FIGS. 16A and 16B illustrate polar plots by using a second-order transfer function to respectively simulate the characteristic impedances of ADSL and VDSL telecommunication loops.
Figure 16B:
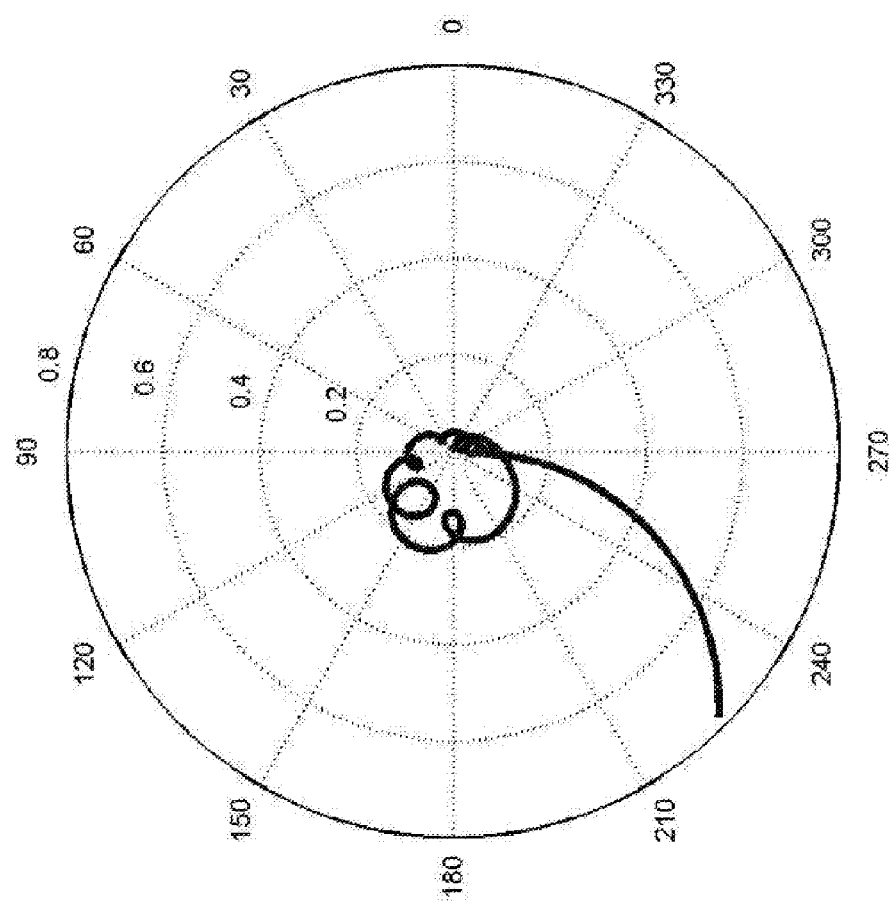

Generally, since ADSL and VDSL have different operating frequency bands, their individual echo cancelling circuit focuses on different frequency bands as simulating the characteristic impedance of the telecommunication loop. In the prior art where the transfer function is implemented by active components, there must be different echo cancelling circuits for ADSL and VDSL. On the contrary, the present invention uses passive components to implement transfer functions, which can switch among various orders, so it is easy to simulate the characteristic impedances required by ADSL and VDSL by adjusting the connection manners of the passive components according to the focused frequency bands of ADSL and VDSL. That is, the echo cancelling circuit of the present invention is applicable to both ADSL and VDSL. Please refer to FIG. 14A and FIG. 14B, illustrating polar plots by using a zero-order transfer function to respectively simulate the characteristic impedances of ADSL and VDSL telecommunication loops. The VDSL polar plot has more circles in comparison with the ADSL polar plot because the operating frequency band of VDSL is higher, which causes the phase to change rapidly between 0° and 360°. Please refer to FIGS. 15A, 15B and FIGS. 16A, 16B, illustrating polar plots by respectively using a first-order transfer function and a second-order transfer function to simulate the characteristic impedances of ADSL and VDSL telecommunication loops. Similarly, in comparison with the polar plot of ADSL, the phase in the polar plot of VDSL changes more rapidly.

Figure 17:
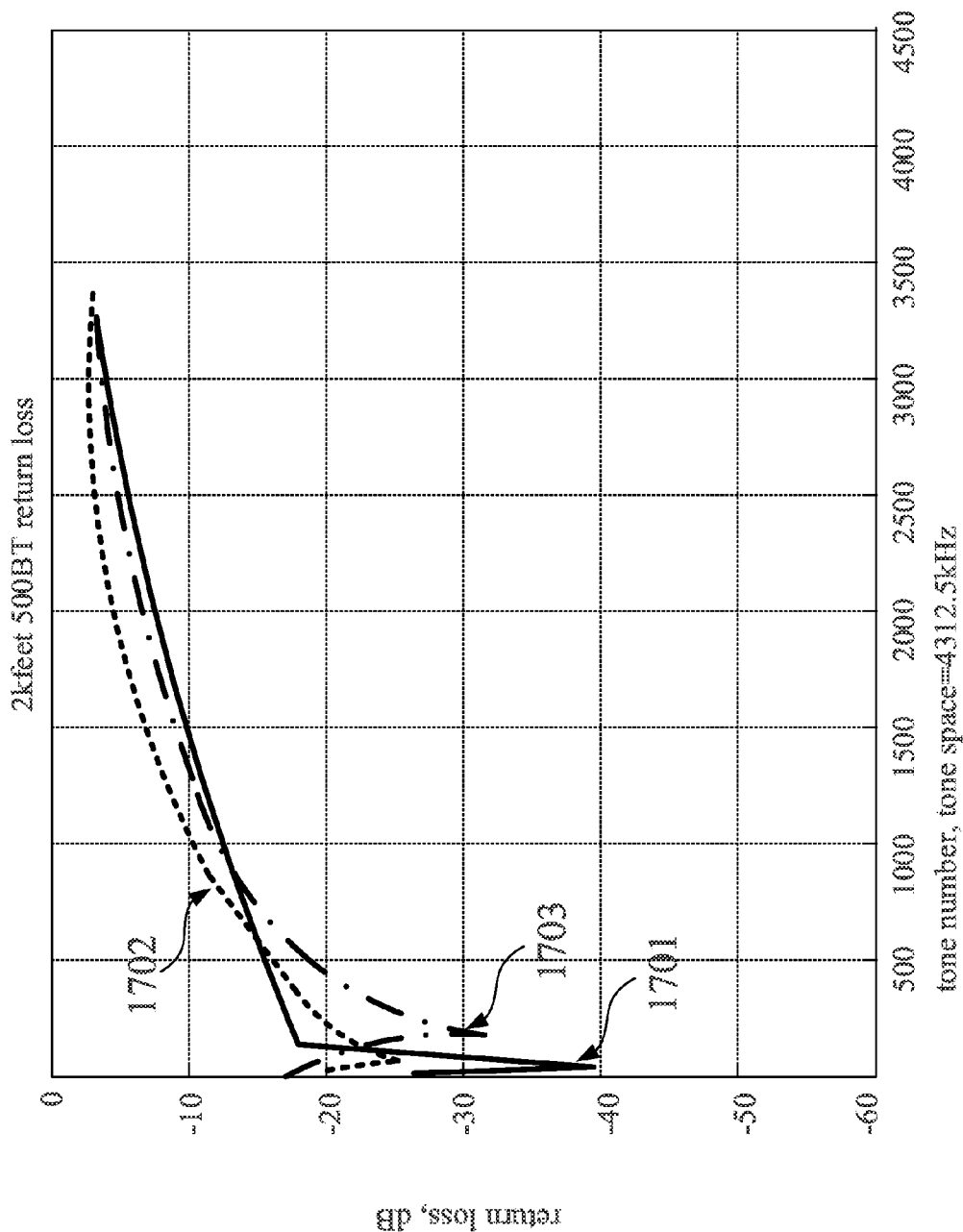
FIG. 17 illustrates a return loss of the signal transmitting and receiving circuit 105 where the echo cancelling circuit 430 uses transfer functions with different orders in VDSL according to an embodiment of the present invention.

Please refer to FIG. 17, illustrating a return loss of the signal transmitting and receiving circuit 105 where the echo cancelling circuit 430 uses transfer functions with different orders in VDSL according to an embodiment of the present invention. The curve 1701 represents a zero-order transfer function of the echo cancelling circuit 430, the curve 1702 represents a first-order transfer function of the echo cancelling circuit 430, and the curve 1703 represents a second-order transfer function of the echo cancelling circuit 430. Generally, using the first-order or the second-order transfer functions can probably obtain good echo cancelling results at certain frequency bands, but since VDSL has a wider frequency band than ADSL, for the overall VDSL frequency band, the echo cancelling effects of the first-order and the second-order transfer functions are not better than the echo cancelling effect of the frequency-independent zero-order transfer function. Therefore, in a preferred embodiment of the present invention the echo cancelling circuit preferably uses the zero-order transfer function for VDSL applications. If, however, a particular frequency band in the VDSL application used by the client and the central office can be determined in advance according to communication protocols, the first-order, the second-order or even higher-order transfer functions can then be used to cancel echo signals in that particular frequency band.

Please note that the shape, size, and ratio of any element in the disclosed figures are just exemplary for understanding, not for limiting the scope of this invention. Besides, each aforementioned embodiment may comprise one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal transmitting and receiving circuit of a digital subscriber line for transmitting an output signal to a telecommunication loop or receiving an input signal from the telecommunication loop, comprising:
   a transformer comprising a first winding, a second winding, and a third winding, the first winding comprising a first coil and a second coil, the third winding coupled to the telecommunication loop and the first and the second coils comprising respectively a first polarity end and a second polarity end;
   a first impedance unit comprising two ends coupled respectively to the first polarity end of the first coil and the first polarity end of the second coil;
   a second impedance unit comprising two ends coupled respectively to the second polarity end of the first coil and the second polarity end of the second coil;
   a signal transmitting module, coupled to the first winding, for generating the output signal; and
   a signal receiving module, coupled to the second winding, for processing the input signal;
   wherein, the first winding and the third winding transmit the output signal to the telecommunication loop by electromagnetic coupling, and the third winding and the second winding transmits the input signal to the signal receiving module by electromagnetic coupling.

2. The signal transmitting and receiving circuit of claim 1, wherein the second winding comprises a third coil and a fourth coil, the third and the fourth coils comprise respectively a first polarity end and a second polarity end, and the signal receiving module comprises a receiving differential signal pair, whose positive end is coupled to the first polarity end of the third coil and negative end is coupled to the second polarity end of the fourth coil.

3. The signal transmitting and receiving circuit of claim 2, wherein the signal transmitting module comprises a transmitting differential signal pair, whose positive end is coupled to the first polarity end of the first coil and negative end is coupled to the second polarity end of the second coil.

4. The signal transmitting and receiving circuit of claim 2, further comprising:
   a third impedance unit with one of its two ends coupled to the first polarity end of the first coil and the first polarity end of the fourth coil and the other end coupled to the second polarity end of the fourth coil; and
   a fourth impedance unit with one of its two ends coupled to the second polarity end of the second coil and the second polarity end of the third coil and the other end coupled to the first polarity end of the third coil.

5. The signal transmitting and receiving circuit of claim 4, wherein the third and the fourth impedance units are made of passive components.

6. The signal transmitting and receiving circuit of claim 5, wherein the third and the fourth impedance units comprise at least a resistance component, a capacitance component and a switching component, and the switching component controls whether the equivalent impedance of the third and the fourth impedance units comprises the capacitance component or not.

7. The signal transmitting and receiving circuit of claim 6, wherein when the signal transmitting and receiving circuit is applied to a very high speed digital subscriber line, the switching component controls the equivalent impedance of the third and the fourth impedance units to comprise only the resistance component.

8. The signal transmitting and receiving circuit of claim 1, wherein a turns ratio of the third winding to the first winding is not equal to a turns ratio of the second winding to the third winding.

9. The signal transmitting and receiving circuit of claim 1, wherein the digital subscriber line is an asymmetric digital subscriber line or a very high speed digital subscriber line.

10. A signal transmitting and receiving circuit of a digital subscriber line for transmitting an output signal to a telecommunication loop or receiving an input signal from the telecommunication loop, comprising:
    a transformer coupled to the telecommunication loop;
    a signal transmitting module, coupled to the transformer, for generating the output signal;
    a signal receiving module, coupled to the transformer, for processing the input signal; and
    an echo cancelling circuit made of passive components and comprising two ends, one of which is coupled to the signal transmitting module and the transformer, and the other is coupled to the signal receiving module and the transformer;
    wherein, the output signal is transmitted to the telecommunication loop by electromagnetic coupling of the transformer, and the input signal is transmitted to the signal receiving module by electromagnetic coupling of the transformer, and the echo cancelling circuit comprises at least a resistance component, a capacitance component, and a switching component, and the switching component controls whether the equivalent impedance of the echo cancelling circuit comprises the capacitance component or not.

11. The signal transmitting and receiving circuit of claim 10, wherein the signal transmitting module comprises a transmitting differential signal pair and the signal receiving module comprises a receiving differential signal pair, and the echo cancelling circuit comprises:
    a first impedance unit with one of its two ends coupled to a positive end of the transmitting differential signal pair and the transformer and the other end coupled to a negative end of the receiving differential signal pair and the transformer; and
    a second impedance unit with one of its two ends coupled to a negative end of the transmitting differential signal pair and the transformer and the other end coupled to a positive end of the receiving differential signal pair and the transformer.

12. The signal transmitting and receiving circuit of claim 11, wherein the transformer comprises:
   a first winding, coupled to the signal transmitting module, comprising a first coil and a second coil, and the first and the second coils comprising respectively a first polarity end and a second polarity end;
   a second winding, coupled to the signal receiving module; and
   a third winding, coupled to the telecommunication loop;
   and the signal transmitting and receiving circuit further comprises:
   a third impedance unit with its two ends coupled respectively to the first polarity end of the first coil and the first polarity end of the second coil; and
   a fourth impedance unit with its two ends coupled respectively to the second polarity end of the first coil and the second polarity end of the second coil;
   wherein a positive end of the transmitting differential signal pair is coupled to the first polarity end of the first coil and a negative end of the transmitting differential signal pair is coupled to the second polarity end of the second coil.

13. The signal transmitting and receiving circuit of claim 12, wherein the second winding comprises a third coil and a fourth coil both comprising the first polarity end and the second polarity end, and a positive end of the receiving differential signal pair is coupled to the first polarity end of the third coil, the negative end of the receiving differential signal pair is coupled to the second polarity end of the fourth coil, the positive end of the transmitting differential signal pair is coupled to the first polarity end of the fourth coil, and the negative end of the transmitting differential signal pair is coupled to the second polarity end of the third coil.

14. The signal transmitting and receiving circuit of claim 12, where a turns ratio of the third winding to the first winding is not equal to a turns ratio of the second winding to the third winding.

15. The signal transmitting and receiving circuit of claim 10, wherein when the signal transmitting and receiving circuit is applied to a very high speed digital subscriber line, the switching component controls the equivalent impedance of the echo cancelling circuit to comprise only the resistance component.

16. A signal transmitting and receiving circuit of a digital subscriber line for transmitting an output signal to a telecommunication loop or receiving an input signal from the telecommunication loop, comprising:
   a transformer coupled to the telecommunication loop;
   a signal transmitting module, coupled to the transformer and comprising a transmitting differential signal pair, for generating the output signal;
   a signal receiving module, coupled to the transformer and comprising a receiving differential signal pair, for processing the input signal; and
   an echo cancelling circuit made of passive components and having one of its two ends coupled to the signal transmitting module and the transformer, and the other end coupled to the signal receiving module and the transformer, comprising:
      a first impedance unit with one of its two ends coupled to a positive end of the transmitting differential signal pair and the transformer and the other end coupled to a negative end of the receiving differential signal pair and the transformer; and
      a second impedance unit with one of its two ends coupled to a negative end of the transmitting differential signal pair and the transformer and the other end coupled to a positive end of the receiving differential signal pair and the transformer;
   wherein, the output signal is transmitted to the telecommunication loop by electromagnetic coupling of the transformer, and the input signal is transmitted to the signal receiving module by electromagnetic coupling of the transformer.

17. The signal transmitting and receiving circuit of claim 16, wherein the transformer comprises:
   a first winding, coupled to the signal transmitting module, comprising a first coil and a second coil, and the first and the second coils comprising respectively a first polarity end and a second polarity end;
   a second winding, coupled to the signal receiving module; and
   a third winding, coupled to the telecommunication loop;
   and the signal transmitting and receiving circuit further comprises:
   a third impedance unit with its two ends coupled respectively to the first polarity end of the first coil and the first polarity end of the second coil; and
   a fourth impedance unit with its two ends coupled respectively to the second polarity end of the first coil and the second polarity end of the second coil;
   wherein a positive end of the transmitting differential signal pair is coupled to the first polarity end of the first coil and a negative end of the transmitting differential signal pair is coupled to the second polarity end of the second coil.

18. The signal transmitting and receiving circuit of claim 17, wherein the second winding comprises a third coil and a fourth coil both comprising the first polarity end and the second polarity end, and a positive end of the receiving differential signal pair is coupled to the first polarity end of the third coil, the negative end of the receiving differential signal pair is coupled to the second polarity end of the fourth coil, the positive end of the transmitting differential signal pair is coupled to the first polarity end of the fourth coil, and the negative end of the transmitting differential signal pair is coupled to the second polarity end of the third coil.

19. The signal transmitting and receiving circuit of claim 17, where a turns ratio of the third winding to the first winding is not equal to a turns ratio of the second winding to the third winding.

* * * * *